US012789337B2

(12) United States Patent
Ayres

(10) Patent No.: US 12,789,337 B2
(45) Date of Patent: Nov. 10, 2026

(54) REBAR CLIP INSTALLATION TOOL

(71) Applicant: Donald B. Ayres, Northbrook, IL (US)

(72) Inventor: Donald B. Ayres, Northbrook, IL (US)

( * ) Notice: Subject to any disclaimer, the term of this patent is extended or adjusted under 35 U.S.C. 154(b) by 374 days.

(21) Appl. No.: 18/399,967

(22) Filed: Dec. 29, 2023

(65) Prior Publication Data

US 2025/0214211 A1 Jul. 3, 2025

(51) Int. Cl.

*E04G 21/12* (2006.01)
*B25B 31/00* (2006.01)
*E04C 5/16* (2006.01)

(52) U.S. Cl.

CPC .............. *B25B 31/00* (2013.01); *E04C 5/167* (2013.01); *E04G 21/122* (2013.01); *Y10T 29/53783* (2015.01)

(58) Field of Classification Search

CPC ....... E04G 21/122; E04C 5/167; E04C 5/163; B25B 31/00; B25B 27/146; Y10T 29/53783
USPC .......................... 29/243.56, 525.01; 206/340
See application file for complete search history.

(56) References Cited

U.S. PATENT DOCUMENTS

| | | | |
|---|---|---|---|
| 721,434 | A | 2/1903 | Edeburn |
| 1,451,717 | A | 4/1923 | Sommer |
| 2,455,557 | A | 12/1948 | Burner |
| 2,622,634 | A | 12/1952 | Hill |
| 2,722,006 | A | 11/1955 | Ingram |
| 2,923,008 | A | 2/1960 | Ingram |
| 3,461,536 | A | 8/1969 | Skold |
| 3,583,056 | A | 6/1971 | Klenz |
| 3,916,593 | A | 11/1975 | Skold |
| 3,945,238 | A | 3/1976 | Eckert |
| 4,546,528 | A | 10/1985 | Langas |
| 5,020,355 | A | 6/1991 | Payne et al. |
| 5,661,886 | A | 9/1997 | Smith |
| 5,826,629 | A | 10/1998 | West |
| 5,881,452 | A | 3/1999 | Nowell, III et al. |
| 5,938,099 | A | 8/1999 | Ciccarelli |
| 6,317,970 | B1 | 11/2001 | Leistner et al. |
| 6,725,535 | B2 | 4/2004 | Edson et al. |

(Continued)

OTHER PUBLICATIONS

International Search Report and Written Opinion for International Application No. PCT/US2024/062322 mailed on Mar. 11, 2025 (9 pages).

*Primary Examiner* — Mahdi H Nejad
(74) *Attorney, Agent, or Firm* — Lempia Summerfield Katz LLC

(57) ABSTRACT

A manually operated tool for placing clips on rebar comprises a hub assembly, a pair of grippable handles pivotally mounted to the hub assembly, and a magazine for holding a string of clips. The hub assembly includes a driver and a body of spaced side plates and guides extending between the side plates defining a channel for the driver to reciprocate. When the handles are rotated and closed together, connecting links extending between the handle and the driver effect downward linear movement of the driver detaching a clip from the clip string positioned under the driver and forcing it over rebars positioned within locators at the lower end of the hub assembly. When the handles are opened, the driver is retracted and a spring biased feeder engages the clip string to push another clip under the driver. A spring biased catch prevents clips from moving backward toward the magazine.

20 Claims, 12 Drawing Sheets

(56) References Cited

U.S. PATENT DOCUMENTS

| | | | | |
|---|---|---|---|---|
| 6,966,104 | B2 | 11/2005 | Gregel et al. | |
| 7,559,532 | B1 | 7/2009 | Kodi | |
| 7,891,074 | B2 | 2/2011 | Kodi | |
| 7,908,723 | B1 | 3/2011 | Kodi | |
| 7,963,392 | B2 | 6/2011 | Kodi | |
| 8,322,006 | B1 | 12/2012 | Kodi | |
| 8,402,634 | B2 | 3/2013 | Liu et al. | |
| 8,640,323 | B2 | 2/2014 | Kodi | |
| 8,776,328 | B2 | 7/2014 | Kodi | |
| 8,955,679 | B2 * | 2/2015 | Kodi | E04C 5/167 52/719 |
| 9,267,288 | B2 | 2/2016 | Kodi | |
| 9,394,692 | B2 | 7/2016 | Kodi | |
| 9,797,148 | B2 | 10/2017 | Kodi | |
| 11,319,707 | B1 * | 5/2022 | Ayres | E04C 5/167 |
| 2007/0284385 | A1 | 12/2007 | Carraher et al. | |
| 2011/0139644 | A1 | 6/2011 | Kodi | |
| 2014/0026409 | A1 * | 1/2014 | Liu | B25C 5/1617 29/811.2 |
| 2016/0069096 | A1 * | 3/2016 | Kodi | E04C 5/163 29/243.56 |
| 2016/0201342 | A1 | 7/2016 | Sivadjian | |

* cited by examiner

REBAR CLIP INSTALLATION TOOL

TECHNICAL FIELD OF THE INVENTION

The present invention relates to tools and, more particularly, to tools for installing collated rebar clips used for tying rebars together.

BACKGROUND OF THE INVENTION

Concrete is a composite material made of fine and coarse aggregate bonded together with a fluid cement. After being poured and over time, it hardens and cures into a stone like substance.

Concrete is a convenient material used to construct roads, buildings, and other manmade structures. It is very strong in compression, but it is weak in tension as the concrete holding the aggregate together can crack allowing the structure to fail. To prevent this, steel reinforcing bars, or rebar, is placed within the concrete during construction to add tensile strength and increase the tensile load that can be carried. Rebar is supplied as long, thick wires or rods and is usually arranged horizontally or vertically in a grid or matrix pattern to form a flat mat or curtain, or in a three dimensional cage. Before concrete is poured over the rebar to encase it, the lengths of transversely intersecting rebar are joined together by short lengths of thin steel wire that is wrapped around the joints to tie or bind the rebar fixedly together preventing their relative movement. This is typically done manually and is a costly, time consuming, labor intensive, and backbreaking operation. It requires a worker to carry a wire reel or a supply of short wires and to constantly bend over while twisting the wires around the rebar with pliers or some other tool.

While tools have been developed to automatically apply and twist wire to tie rebar together, these tools are relatively complicated and require electrical power or compressed air to operate. At many construction sites, these power sources are not readily available, or when available, subject to intermittent supply.

Molded plastic clips have been developed in attempt to eliminate some of these issues. This type of clip can be snapped over adjoining rebars to lock them together. While automatic install tools can be used to install these clips, they still require a power source. In addition, these clips are available in relatively short lengths because the clips are molded as a integral piece so that they are connected together by the same material that makes up the clips. The frequent reloading of the install tool with short strips of clips results in a large amount of unproductive time that might otherwise be devoted to more productive labors.

SUMMARY OF THE INVENTION

The present invention is directed to overcoming one or more of the problems as set forth above.

It is an objective of the present invention to provide a tool that is cost effective during construction of rebar grids by enabling clips to be applied to rebars quickly and efficiently.

It is an objective of the present invention to provide a manually operated tool that does not require an outside power source, such as electricity, batteries, or compressed air.

It is an objective of the present invention to provide a tool that is capable of holding a large number of clips enabling long operating times between clip reloads.

It is an objective of the present invention to provide a tool that can be loaded with a flexible string of clips that can be easily separated from one another as they are used.

It is an objective of the present invention to provide a manually operated tool having large mechanical advantage enabling the tool to be operated easily with minimal exertion by a user.

It is an objective of the present invention to provide a tool of simple design that can be manufactured, maintained, or repaired quickly and inexpensively.

In an exemplary embodiment, a tool for applying rebar tying clips includes a hub assembly, a pair of grippable handles pivotally mounted to the hub assembly, and a magazine for holding a long string of clips.

In an exemplary embodiment, a tool for applying rebar tying clips includes a driver to forcefully move clips from a dispensing position within the hub assembly to an installed position on rebar during one operation of the handles and a feeder for moving clips from the magazine to the dispensing position during another operation of the handles.

In an exemplary embodiment, the handles are pivotally mounted in the hub assembly and are connected to the driver by links so that rotational motion of the handles between open and closed positions reciprocates the driver linearly within the hub assembly and substantial mechanical advantage is achieved.

In an exemplary embodiment, an anti-backup mechanism prevents clips from being moved from a preload position backward towards the magazine.

In an exemplary embodiment, the hub assembly has a pair of spaced side plates and a plurality of guide members spanning the space between the side plates with the guide members defining a first channel for linear movement of the driver and a second channel for passing clips from the magazine to a dispensing position to be engaged by the driver.

In an exemplary embodiment, the driver is movable from a retracted position above a clip in dispensing position downward to an extended position so as to install a clip on rebars and a throat is defined by arms of the side plates at the lower end of the driver channel and is adapted to receive two orthogonally placed rebars and support the rebars while the clip is pushed onto the rebars.

In an exemplary embodiment, guides are provided to align the rebars longitudinally and laterally in the tool so that the openings in the clips receiving the rebars are aligned with the rebars.

In an exemplary embodiment, the driver has a bottom drive surface for engaging the top of a clip in dispensing position and extending walls defining a pocket to hold such a clip in aligned position as the driver pushes the clip downward along the driver channel.

BRIEF DESCRIPTION OF DRAWINGS

The details of construction and operation of the invention are more fully described with reference to the accompanying drawings which form a part hereof and in which like reference numerals refer to like parts throughout.

In the drawings.

Figure 1:
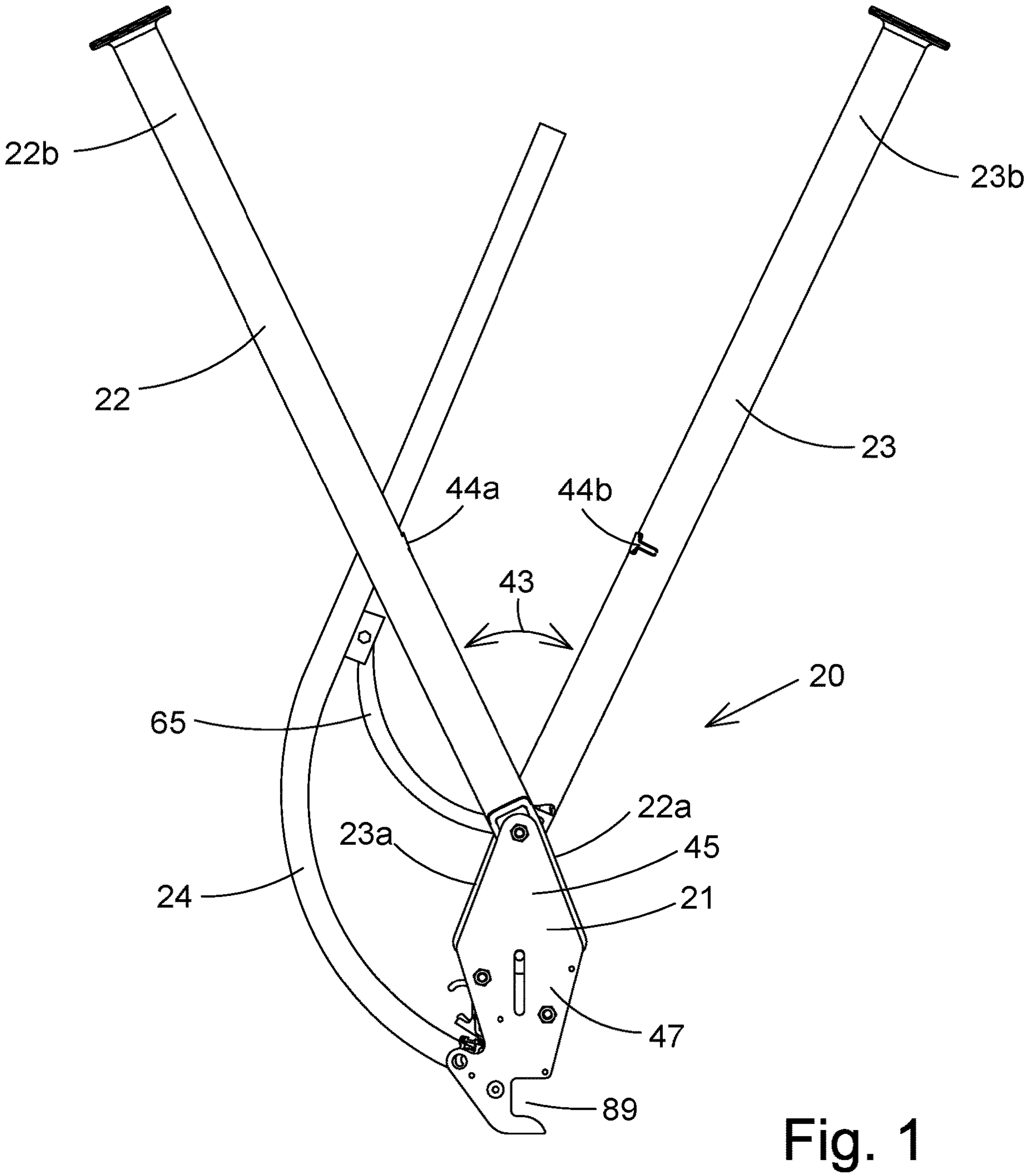
FIG. 1 is a right side elevational view of a tool for installing rebar clips.

All figures are drawn for ease of explanation of the basic teachings of the present invention only; the extensions of the figures with respect to number, position, relationship, and dimensions of the parts to form the preferred embodiment will be explained or will be within the skill of the art after the following teachings of the present invention have been read and understood.

DETAILED DESCRIPTION OF THE INVENTION

While the present invention is susceptible of embodiment in many different forms, there are shown in the drawings and will be described herein in detail a specific embodiment thereof with the understanding that the present disclosure is to be considered as an exemplification of the principles of the invention and is not intended to limit the invention to the specific embodiment illustrated.

As seen in FIG. 1, a tool 20 for installing clips on rebar to tie them together includes a hub assembly 21 for applying clips, a pair of handles 22,23 for manually operating the tool 20, and a magazine 24 for holding a string of clips 25 that are serially connected together and presenting them into the hub assembly 21.

Figure 2:
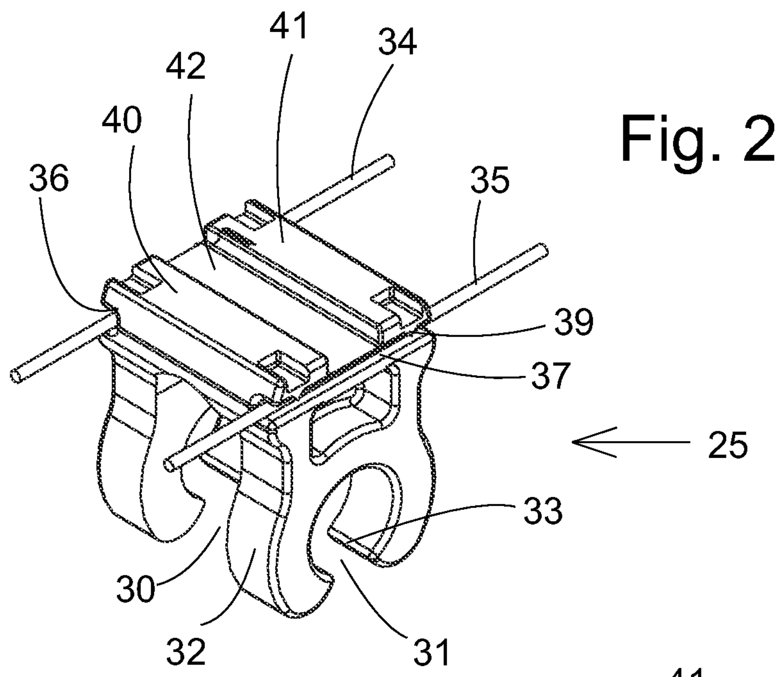
FIG. 2 is a top isometric view of a rebar clip showing cord segments that connect to other rebar clips.
Figure 3:
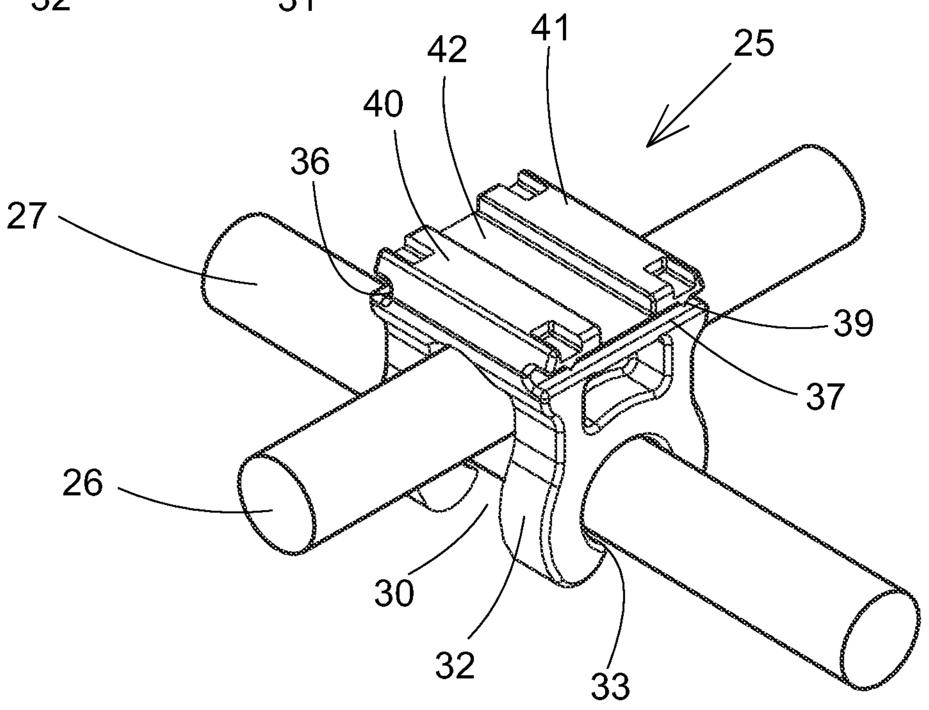
FIG. 3 is a top isometric view of the rebar clip seen in FIG. 2 showing the clip attached to perpendicularly arranged bars.

In FIGS. 2 and 3, a rebar clip, generally designated 25, of the type installed by the tool 20 described herein is shown. The clip 25 ties a longitudinally extending rebar 26 to a laterally extending rebar 27 that underlies the longitudinal rebar 26. The clip 25 is made as an integral piece from polycarbonate, or other suitable plastic or material and has two intersecting channels 30,31 defining four legs, collectively designated 32, extending downward from the top portion of the clip 25 along the vertical corner edges. Longitudinal channel 30 is U-shaped and extends longitudinally and lateral channel 31 is generally C-shaped and extends laterally orthogonal to adjoining channel 30. The U-shaped channel 30 has a depth greater than the C-shaped channel 31.

As seen in FIG. 3, when the clip 25 placed over the rebars 26,27, the longitudinal rebar 26 will overlie and be orthogonal to the lateral rebar 27. The legs 32 have inwardly extending feet, collectively designated 33, that partially close the end of the channel 30 to hold the lateral rebar 27 within the C-shaped lateral channel 31. In turn, the underlying lateral rebar 27 holds the longitudinal rebar 26 up within the U-shaped longitudinal channel 30. When the clip 25 is placed over the rebars 26,27, the four legs 32 extend downward along the sides of the rebars 26,27 fixedly tying the rebars 26,27 together.

Figure 11:
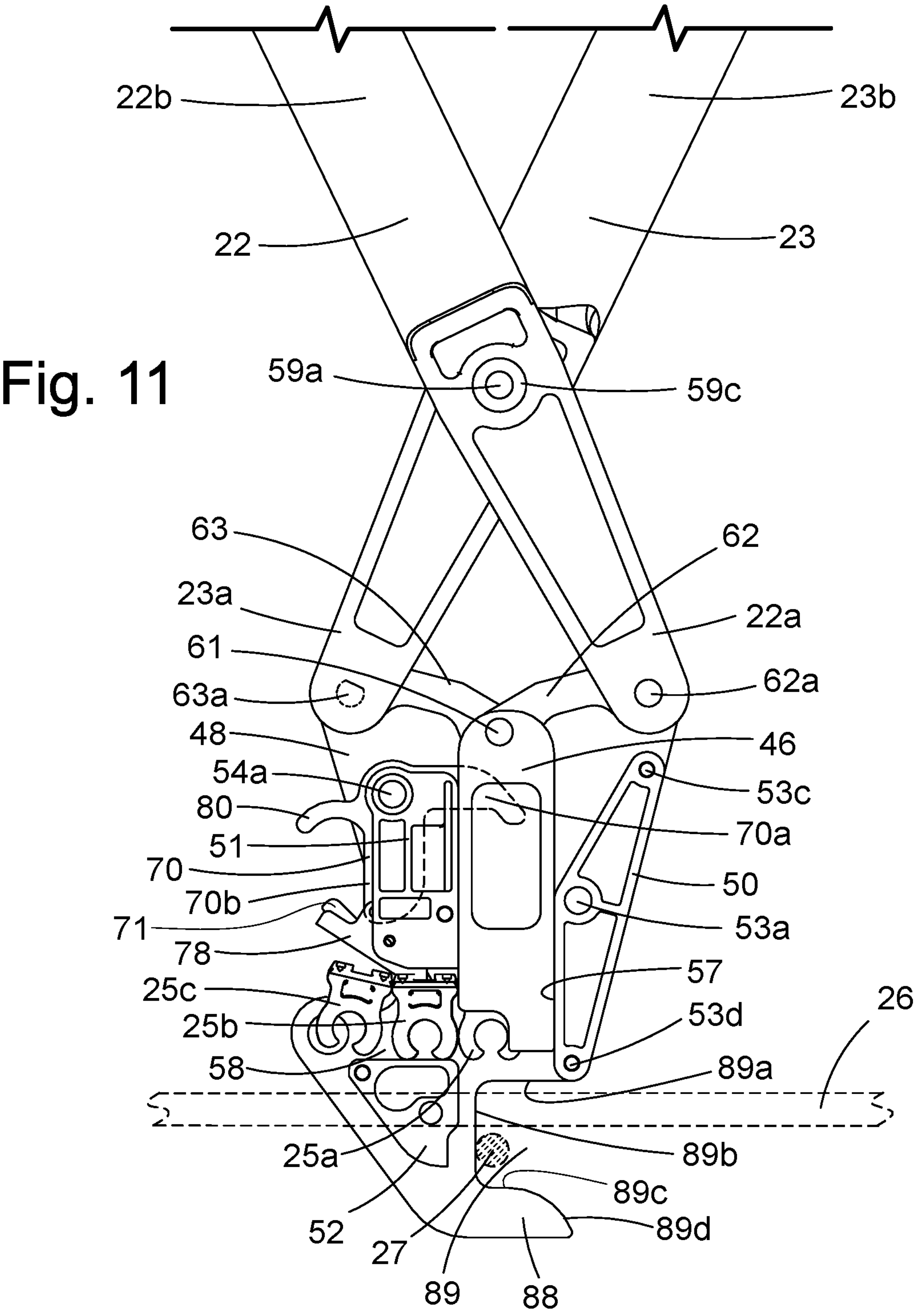
FIG. 11 is an enlarged, right side view of the hub assembly with the right side plate removed showing the driver in retracted position and the rebars and parts of the feeder lever shown in phantom.

A plurality of rebar clips 25 are serially arranged in end to end relation as shown in FIG. 11 and are connected to a pair of longitudinally extending cords 34,35 to create a long, longitudinal, collated string of rebar clips 25. Both of the relatively small diameter cords 34,35 are made of polyethylene, or other plastic or suitable material, and are flexible and easily severable.

A pair of longitudinally extending grooves 36,37 are defined in the upper sides of the clip 25 with each of the grooves 36,37 having a dimension allowing the cords 34,35 to be placed within the respective grooves 36,37. Teeth, collectively designated 39, extend downward into each of the grooves 36,37 to engage and retain the respective cords 34,35 within their respective grooves 36,37 by pressing the cords 34,35 against the groove wall opposite the teeth 39.

Extending upward from the top of the each clip 25 are laterally extending raised ribs 40,41 at each longitudinal end that are separated by a laterally extending recess 42.

A long string of such collated clips can be loaded into the tool magazine 24. The magazine 24 acts as a chute to deliver the serially connected clips 25 to the hub assembly 21. As will be described hereafter, the clips 25 introduced from the magazine 24 will be detached from the end of the string and individually positioned and placed onto the rebars 26,27.

The tool 20 for placing a clip 25 on rebars 26,27 is best described by referring to FIGS. 4-16.

The tool handles 22,23 are pivotally connected to the hub assembly 21 and have inner portions **22*a*,23*a* that extend inwardly within the hub assembly 21 and outer portions 22*b*,23*b* that extend substantially upwardly away from the hub assembly 21. The outer portions 22*b*,23*b* are adapted to be gripped by a user 99 (FIG. 16) and can be manually rotated as indicated by the arrow 43 in FIG. 1 between a closed position where the handles 22,23 are angularly close together and an open position where the handles 22,23 are angularly far apart. The outer portions 22*b*,23*b* may be made from fiber glass, wood, or other suitable material and have terminating end caps. Opposed stops 44*a*,44*b* are located on respective handles 22,23 to limit inward rotation and prevent the handles 22,23 from swinging past each other. While each of the handles 22,23** shown herein is formed with separate elements, it is understood that a handle may be constructed as a single integral piece.

The hub assembly 21 comprises a body 45 and a reciprocatable driver 46. The body 45 includes a pair of parallel side plates 47,48 disposed in spaced relation on either side of a front plate guide 50, a rear blade guide 51, and a lower rebar guide 52. It is contemplated that the side plates 47,48 and the guide 52 be made of steel, while the driver 46 and the guides 50,51 be made of plastic. It is understood that other suitable materials may be employed as well. The internal surfaces of the side plates 47,48 and the guides

50,51,52 define a vertically extending driver channel and a horizontally extending clip channel.

The triangularly shaped front plate guide 50, which closes the front of the hub assembly 21, is fixed between forward portions of the side plates 47,48 by horizontally extending bolt 53*a* and cooperating nut 53*b*, and is held in operative orientation by upper and lower locating pins 53*c*,53*d*, respectively. The rear blade guide 51 is fixed between rearward portions of the side plates 47,48 by horizontally extending bolt 54*a*, cooperating nut 54*b*, and bushing 54*c*, and is held in operative orientation by locating pin 54*d*. The lower rebar guide 52 is fixed between lower portions of the side plates 47,48 by horizontally extending screws 55*a*,55*b* and is held in operative orientation by locating pin 55*c*.

As shown herein, the body 45 forms a driver channel 57 extending vertically and a clip channel 58 extending horizontally and intersecting the driver channel 57. The driver 46 is reciprocated vertically within the driver channel 57 and clips are moved horizontally along the clip channel 58 one at a time into the driver channel 57 under the driver 46.

The linear driver channel 57 has lateral faces defined by the flat inner surfaces 47*a*,48*a* of the respective side plates 47,48, a forward face defined by the rearward surface 50*a* of the front plate guide 50, an upper rearward face defined by the forward inner surface 51*a* of the blade guide 51, and a lower rear face defined by the forward inner surface 52*a* of the rebar guide 52. The upper and lower ends of the driver channel 57 are open.

The linear clip channel 58 has lateral faces defined by the inner surfaces 47*a*,48*a* of the side plates 47,48, an upper face defined by the bottom inner surface 51*b* of the blade guide 51, and a lower face defined by the upper surface 52*b* of the rebar guide 52. The inward end of the clip channel 58 is open and faces the rear surface 50*a* of the front plate guide 50. The outward end of the clip channel 58 is open to receive clips 25 presented from the magazine 24.

The side plates 47,48 each have large top portions mounting the clip driving components of the tool 20 and smaller lower portions for positioning and supporting rebar at the bottom of the tool 20. At the upper end of the top portion is a handle pivot 59, comprised of bolt 59*a*, cooperating nut 59*b*, and a bushing 59*c* that extends orthogonally between the side plates 47,48. The bushing 59*c* pivotally mounts the handles 22,23 between the side plates 47,48 for rotation about an axis orthogonal to the side plates 47,48 between an open position as shown in FIG. 1 and a closed position as partially shown in FIG. 12.

The driver 46 has a rectangularly shaped cross section of a size and configuration similar to the driver channel 57 and reciprocates within the driver channel 57. A central slot 60 is defined located between lateral slots 60*a*,60*b* by lateral walls at the upper end of the driver 46. A driver pivot pin 61 extends through a horizontal bore 60*c* extending through the slots and extends laterally outward from either side of the driver 46 and is slidable within vertical slots 47*b*,48*b* formed in side plates 47,48, respectively.

Connecting links 62,63 extend between the inner portions of respective handles 22,23 and the driver 46. The links 62,63 are pivotally connected to respective handles 22,23 by upper pivot pins 62*a*,63*a* that extend laterally through holes in the inner ends of handles 22,23 and the top end of the links 62,63. The lower ends of the links 62,63 are disposed within respective lateral slots 60*a*,60*b* and are connected to the driver 46 by lower pivot pin 61 that extends through holes in the bottom ends of the links 62,63. The pivot pins are horizontally oriented such that the ends of the links 62,63 rotate about axes that are orthogonal to the side plates 47,48.

The arrangement of the handles 22,23, the links 62,63, and the driver 46 form a crank-link-slider mechanism that converts the rotational motion of the handles 22,23 into reciprocatable linear motion of the driver 46. Since the input distance between the handle pivot 59 and the outermost end of the handles 22,23 is greater than the output distance from the link pivots 62*a*,63*a* to the handle pivot 59, substantial mechanical advantage is achieved. It is contemplated herein that the input distance be at least five times the output distance.

When the handles 22,23 are moved from an open position toward each other, the links 62,63 are closed, lengthening the distance between the handle inner ends and the links lower ends, thereby pushing the driver 46 from a retracted position downward in the driver channel 57 toward an extended position at the bottom of the tool 20 and obstructing the inward end of the clip channel 58 to prevent new clips for entering the driver channel 57 from the clip channel 58. Similarly, when the handles 22,23 are moved from a closed position away from each other, the links 62,63 are opened, shortening the distance between the handle inner ends and the links lower end, thereby pulling the driver 46 from an extended position upward in the driver channel 57 to a retracted position away from the bottom of the tool 20. In retracted position, the inward end of clip channel 58 is no longer obstructed by the driver 46.

The magazine 24 is configured with a chute, or channel 64, to hold a long string of connected clips 25 that are arranged longitudinally therein. The magazine 24 is joined to the hub assembly 21 by trunnion-type tabs that extend laterally outward at the lower end of the magazine 24 and are held within apertures 47*c*,48*c* formed in the side plates 47,48 adjacent the rear of the hub assembly 21. A bracket 65 extending between the magazine 24 and the bolt 59*a* at the exterior of the hub assembly 21 supports the magazine 24 in a generally upright position. The lower end of the magazine 24 is positioned between the spaced side plates 47,48 at the outward end of the clip channel 58 such that serially arranged clips can be introduced into the open outward end of the clip channel 58 and moved toward the driver channel 57. The magazine 24 shown herein is arcuately formed so that the magazine 24 extends away from the handles 22,23 and their swing path. It is understood that since the clip string is flexible, the magazine 24 may take any suitable shape, linear or nonlinear.

Figure 4:
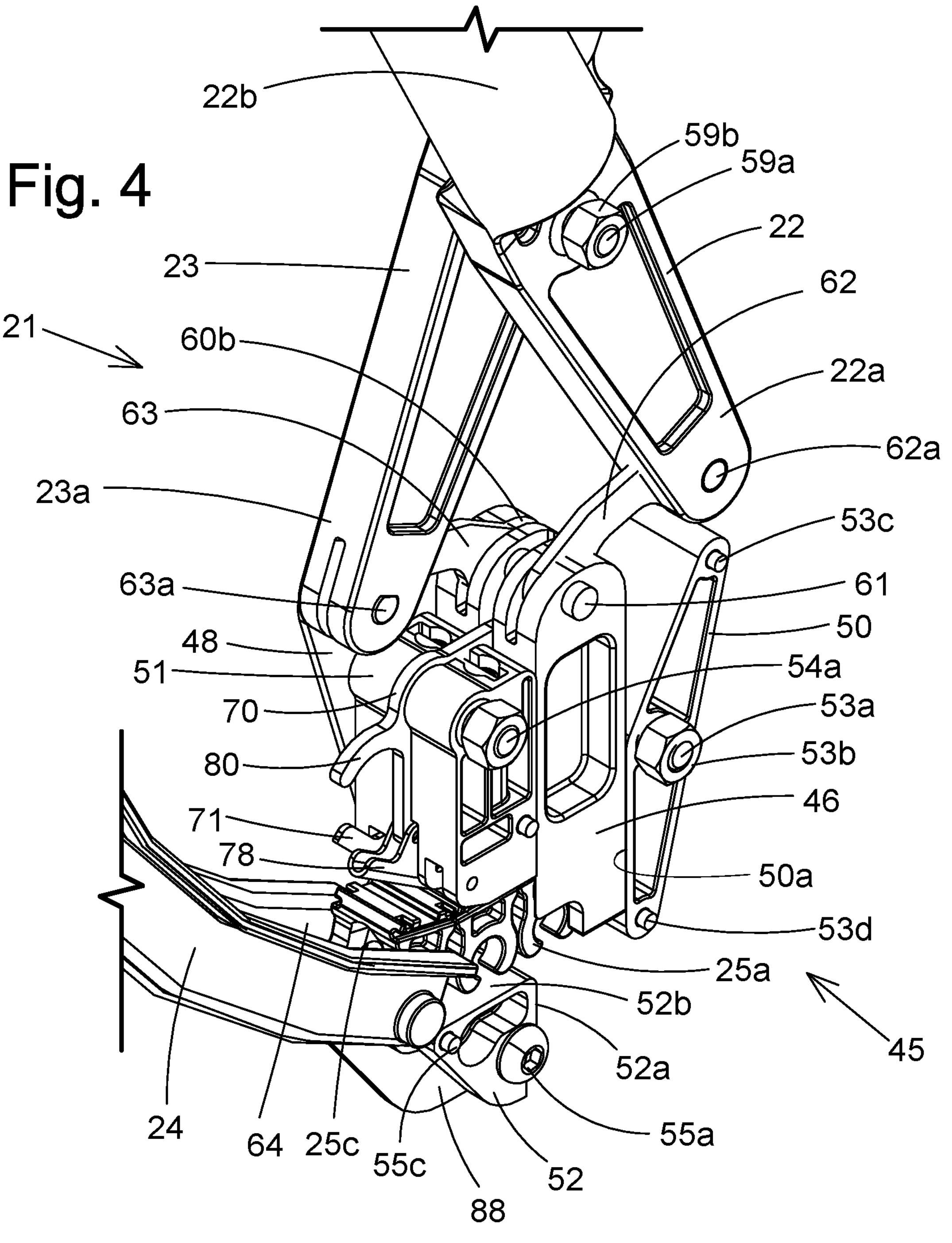
FIG. 4 is an enlarged, partial side isometric view of the hub assembly showing the lower end of an attached magazine.
Figure 5:
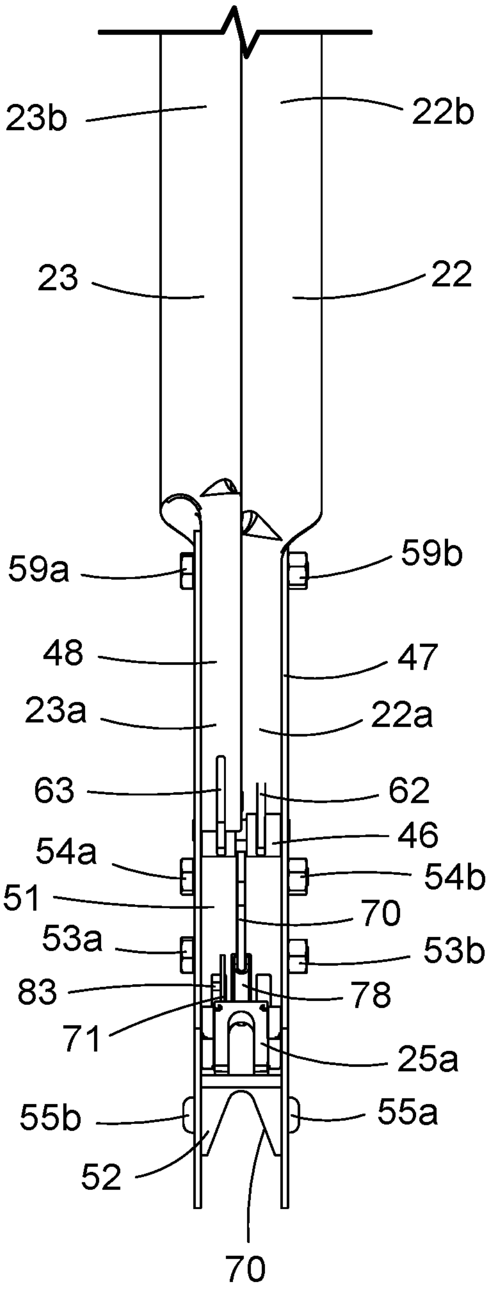
FIG. 5 is an rear elevational view of the hub assembly with the magazine removed to show the blade guide.
Figure 6:
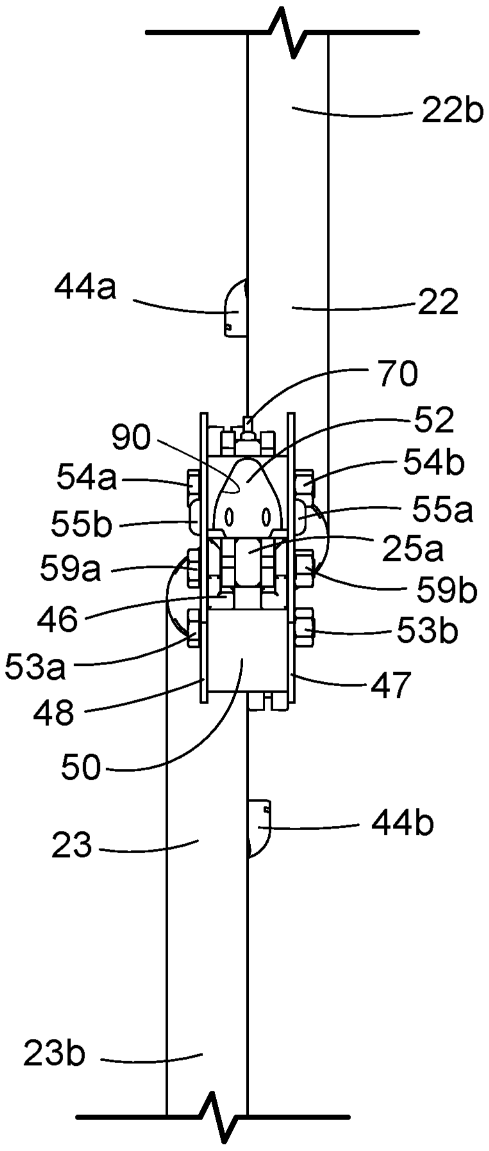
FIG. 6 is a bottom plan view of the hub assembly showing the driver and the rebar guide.
Figure 7:
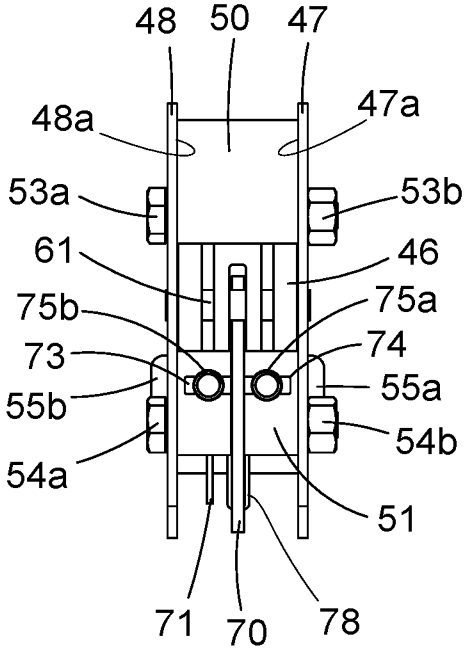
FIG. 7 is an top plan view of the hub assembly with the handles and links removed to show the blade guide.
Figure 8:
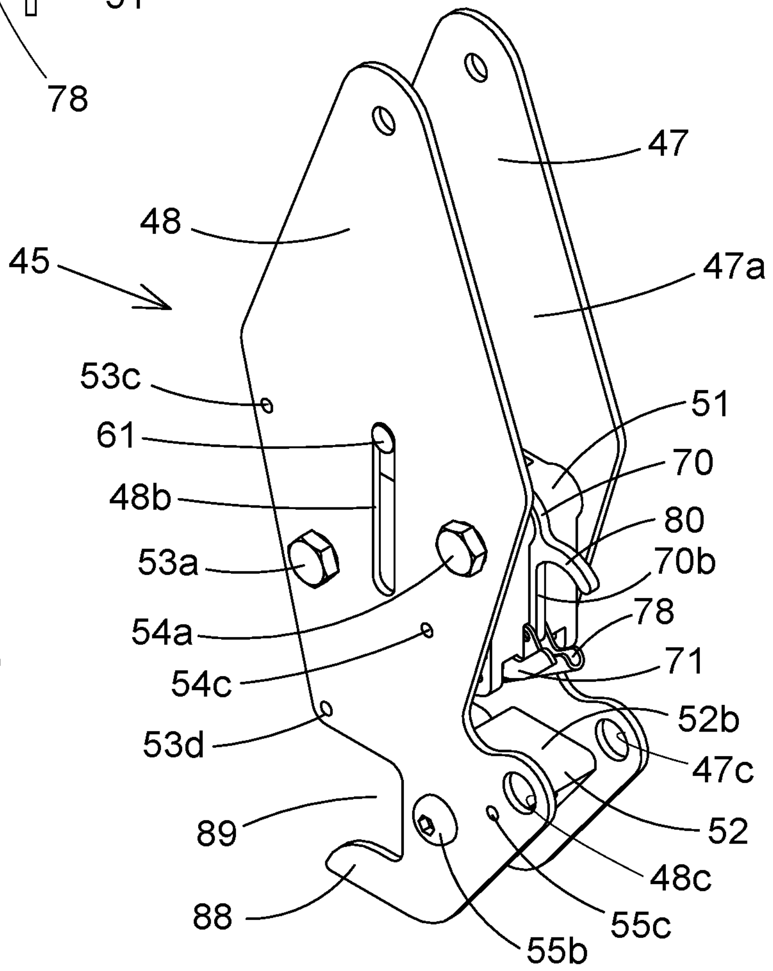
FIG. 8 is a left side isometric view of the hub assembly with the handles and links removed.
Figure 9:
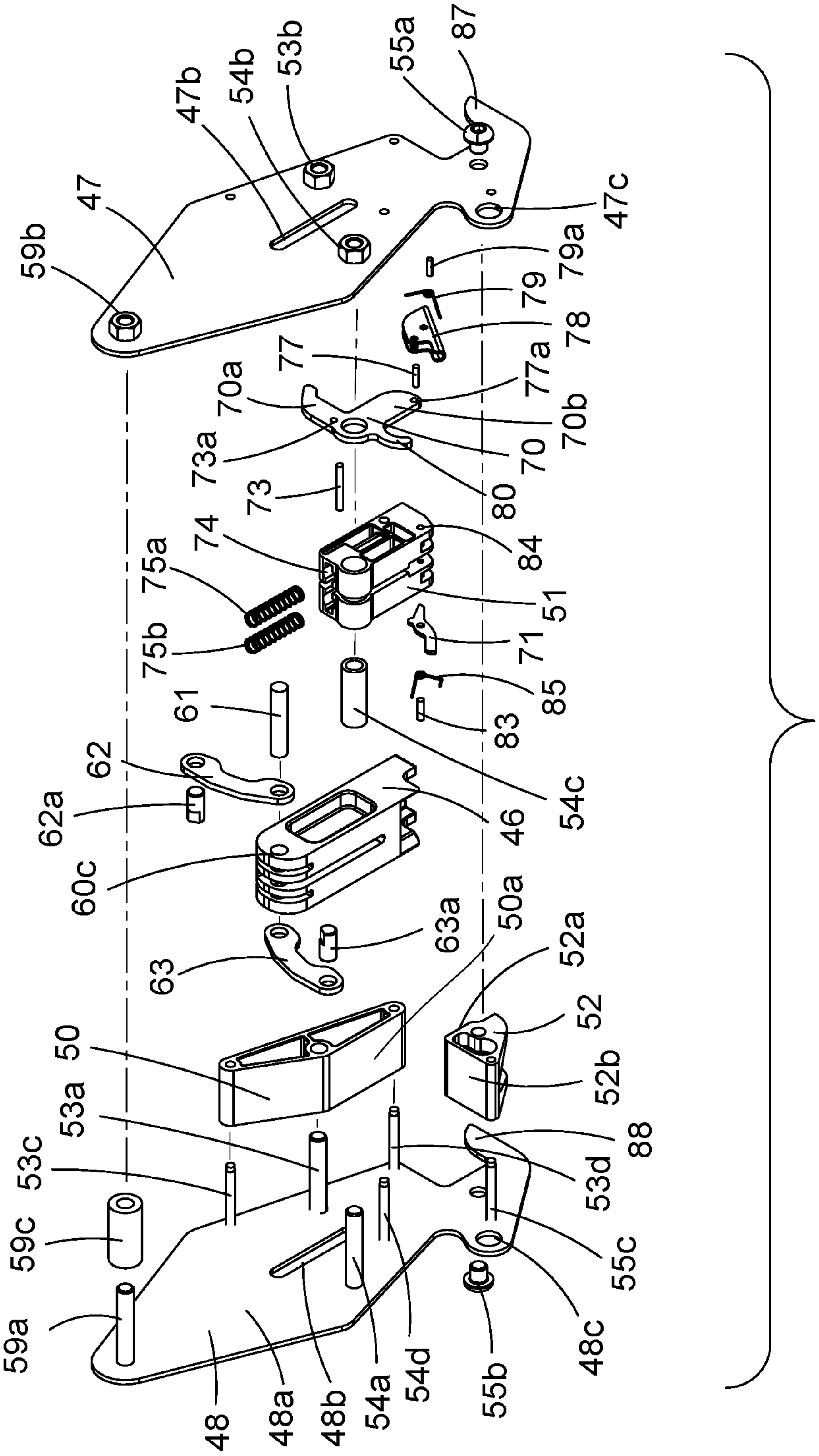
FIG. 9 is an exploded, top view of the hub assembly with the bolts and nuts attached to the side plates.
Figure 10:
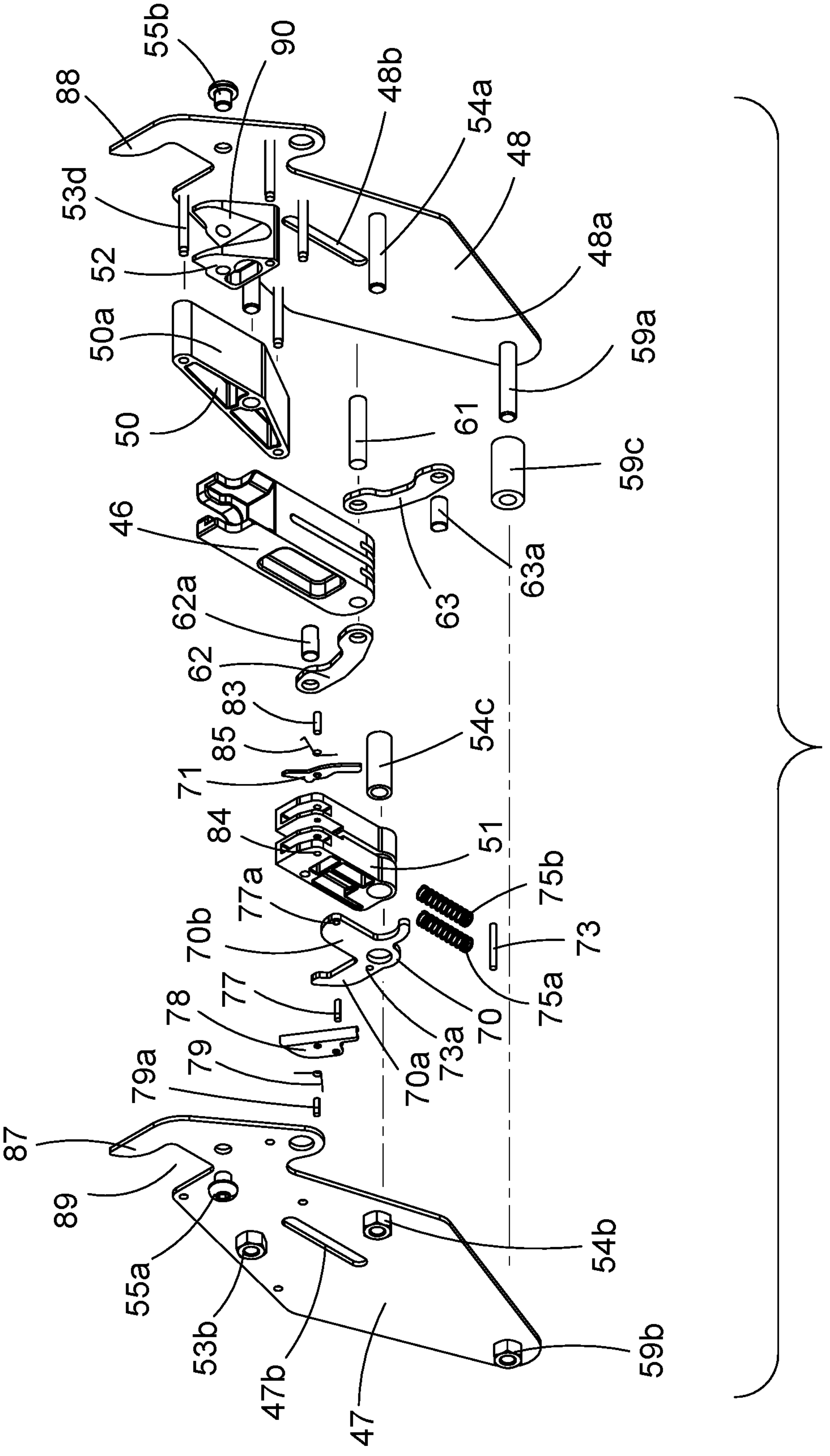
FIG. 10 is an exploded, bottom view of the hub assembly with the bolts and nuts attached to the side plates.

For purposes of illustration herein, three clips 25*a*,25*b*, 25*c* are shown in FIGS. 4 and 11-13 located in the clip channel 58, which has a rectangular cross section. Clip 25*a* is loaded in a dispensing position as seen in FIGS. 4 and 11 and in an installed position in FIGS. 12 and 13. In FIGS. 4 and 11-13, clip 25*b* is shown in a preload position and clip 25*c* is shown in a waiting position as are all of the following clips (not shown).

The bottom of the driver 46 forms a pocket 67 that is sized and adapted to generally conform to the external shape of the clips 25 and the rebars 26,27. The pocket 67 is defined by a bottom drive surface 67*a*, a front wall 67*b*, and a pair of lateral side walls 67*c*,67*d*. The drive surface 67*a* is substantially flat for contacting engagement with the top surface of a clip. The front wall 67*b* forms a U-shaped channel 67*e* closed at its upper end sized to receive a longitudinally extending rebar 26. The side walls 67*c*,67*d* have arcuate concave recesses 67*f*,67*g* at the rearward lower ends that extend partially to the drive face 67*a* and the front wall 67*b*, the recesses being sized to receive a laterally extending rebar 27. The external rear edges 67*h*,67*i* of the side walls 67*c*,67*d* extending from the recesses 67*f*,67*g* upward to the drive face

67*a* are beveled to provide camming guide locators to align a clip in laterally centered position within the pocket 67 as it is moved into dispensing position under the driver 46 from the magazine 24.

Note that while a clip when engaged by the driver 46 is laterally centered, the clip is longitudinally offset rearwardly from the front wall 67*b* of the driver 46. To deliver a force directly over the center of the clip when it is in engagement with the driver 46, the pin 61 at the top of the driver 46 is offset rearwardly from the longitudinal center of the driver 46. Thus, the driver pivot pin 61, which receives downward force from the links 62,63, is longitudinally centered over the pocket 67 offset rearwardly from the center of the driver channel 57.

The blade guide 51 has an internally facing forward surface 51*a*, a downwardly facing bottom surface 51*b*, and an outwardly facing rearward surface 51*c*. The internally facing surface 51*a* is parallel to and spaced from the rearward surface 50*a* of the front plate guide 50. The blade guide 51 acts as a mounting block for a feeder lever 70 and an anti-backup pawl 71. The blade guide bushing 54*c* pivotally mounts the angled feeder lever 70 to the blade guide 51.

The feeder lever 70 is partially disposed within a center slot 72, which is formed in the center of the top, rearward, and bottom sides of the blade guide 51. The feeder lever 70 has a forward arm 70*a* (shown partially in phantom in FIGS. 11 and 12) movable within the center slot 72 at the top side of the blade guide 51 and a downward arm 70*b* movable within the center slot 72 at the back side of the blade guide 51. The forward arm 70*a* extends into the central slot 60 of the driver 46 such that it is engaged by the driver pivot pin 61 when the driver 46 is moved downwardly.

A pin 73 extends horizontally through an aperture 73*a* in the forward arm 70*a* and is vertically movable in a closed-end slot 74 formed in the upper end of the blade guide 51. A pair of vertically oriented compression springs 75*a*,75*b* are disposed in spaced relation under the pin 73 within a pair of cylindrical portions spaced along the slot 74 to effect rotation of the forward arm 70*a* upwardly against the driver pivot pin 61 and rotation of the downward arm 70*b* inwardly into the blade guide 51 urging feeder pawl 78 into engagement with clip 25*a* in the clip channel 58.

At the lower end of the downward arm 70*b*, a pivot pin 77 disposed within an aperture 77*a* pivotally mounts the pivoting feeder pawl 78 that includes a torsion spring 79 carried by pin 79*a*. The feeder pawl 78 moves into and out of the lower end of the center slot 72. The torsion spring 79 acting between the end of the downward arm 70*b* and the feeder pawl 78 provides a resilient force biasing the forward end of the feeder pawl 78 downwardly away from the blade guide 51 into engagement with clips in the clip channel 58. Intermediate the forward arm 70*a* and the downward arm 70*b* of the feeder lever 70 and extending rearward from the feeder lever 70 is a finger 80 that by upward movement enables the manual release of the feeder pawl 78 from engagement with the clips.

Downwardly extending dividing walls (unnumbered) at the bottom of the blade guide 51 define mounting slots 82*a*,82*b* on either lateral side of the center slot 72. A pivot pin 83 inserted through bores 84 in the dividing walls pivotally mounts the anti-backup pawl 71 and a torsion spring 85 within mounting slot 82*a*. The torsion spring 85 acting between the blade guide 51 and the anti-backup pawl 71 provides a resilient force biasing the forward end of the anti-backup pawl 71 downwardly away from the blade guide 51 into the clip channel 58 and into engagement with a clip providing a catch to prevent clips from moving backward toward the magazine 24 while allowing clips to slide by toward the driver channel 57.

Figure 12:
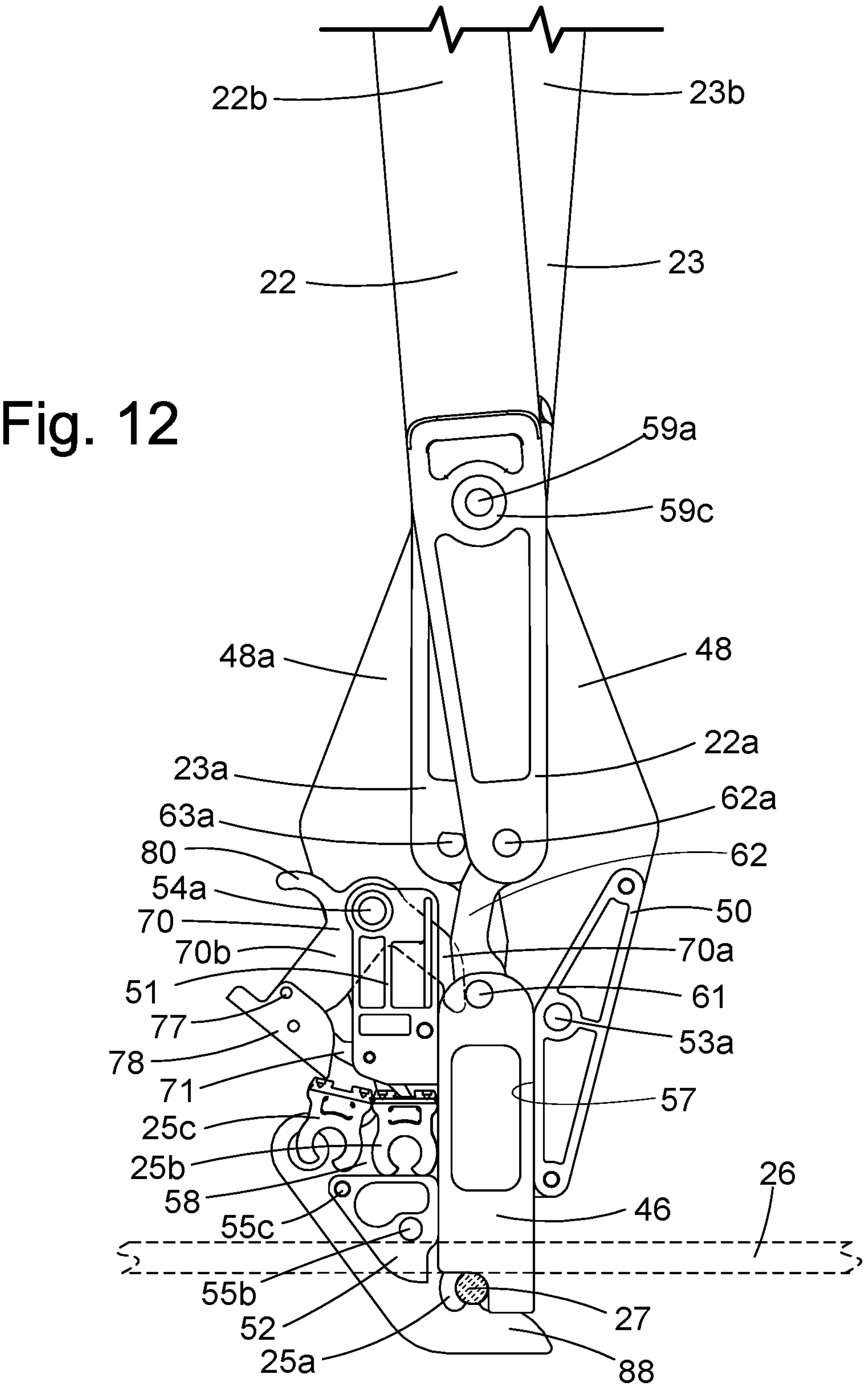
FIG. 12 is an enlarged, right side elevational view of the hub assembly similar to FIG. 11 showing the driver in extended position and the rebars and parts of the feeder lever shown in phantom.
Figure 13:
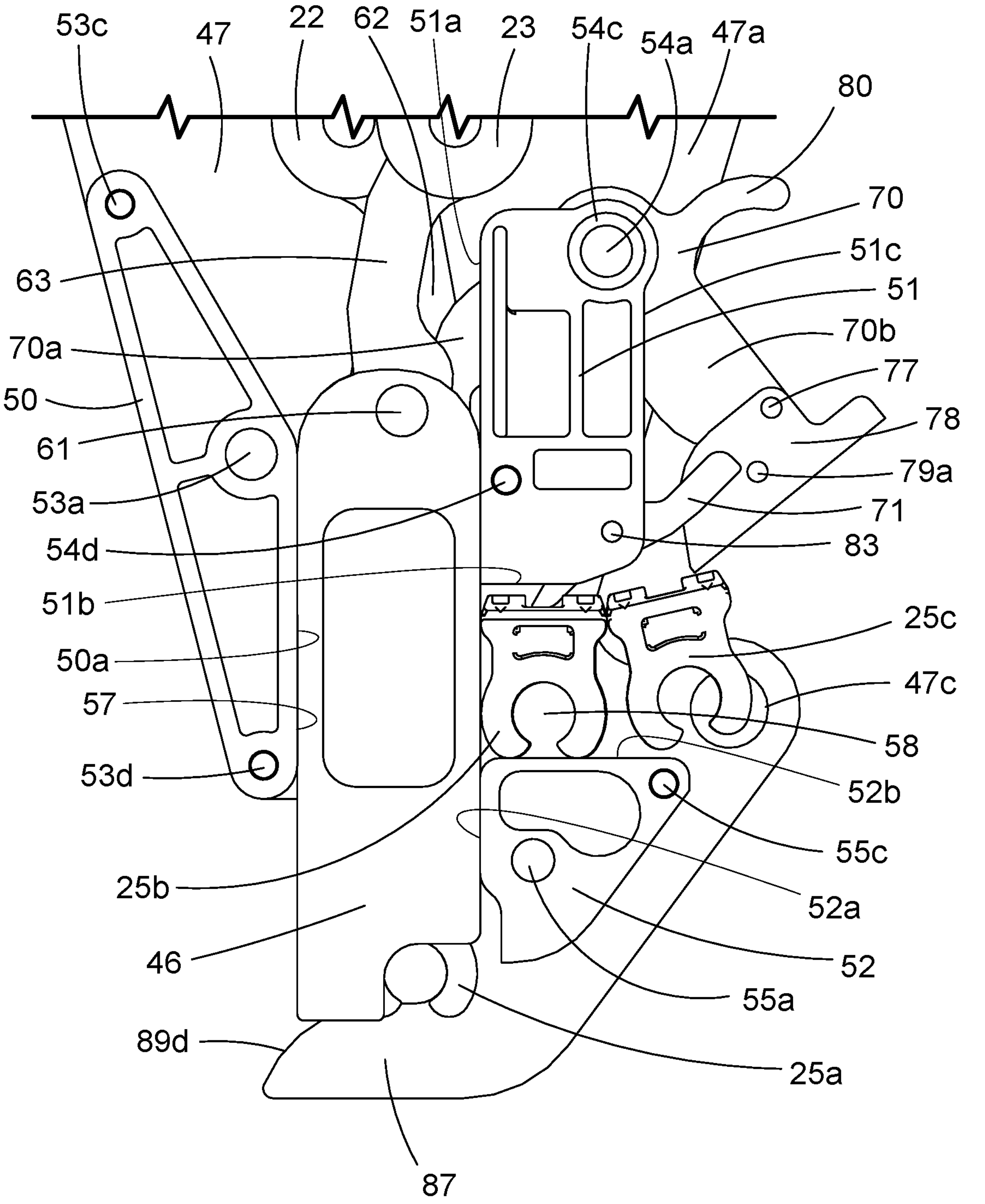
FIG. 13 is an enlarged, left side elevational view of part of the hub assembly with the left side plate removed showing the driver in extended position.
Figure 14:
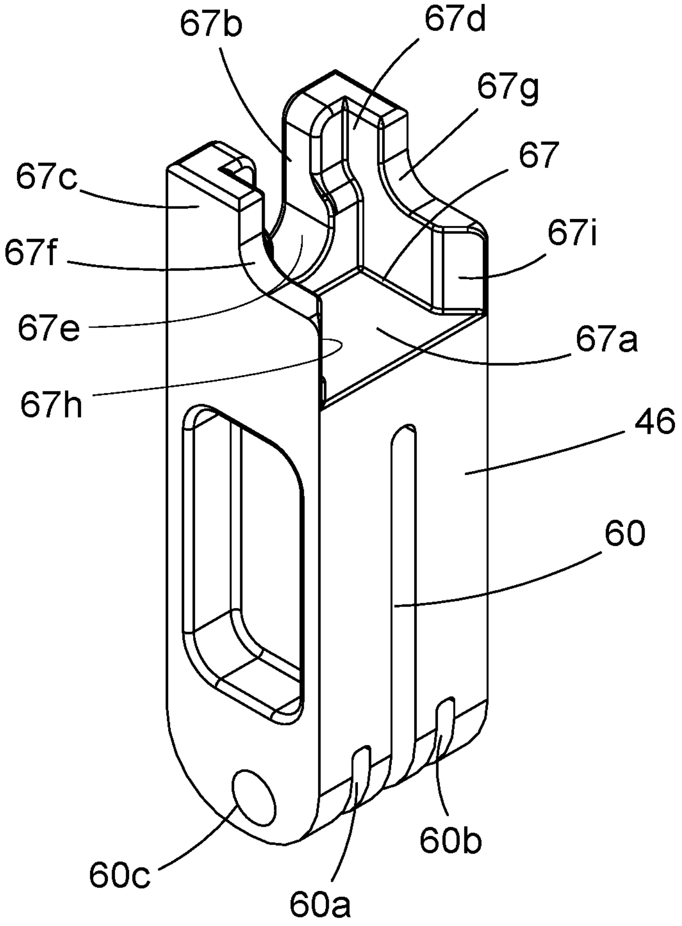
FIG. 14 is an enlarged, bottom isometric view of the driver.
Figure 15:
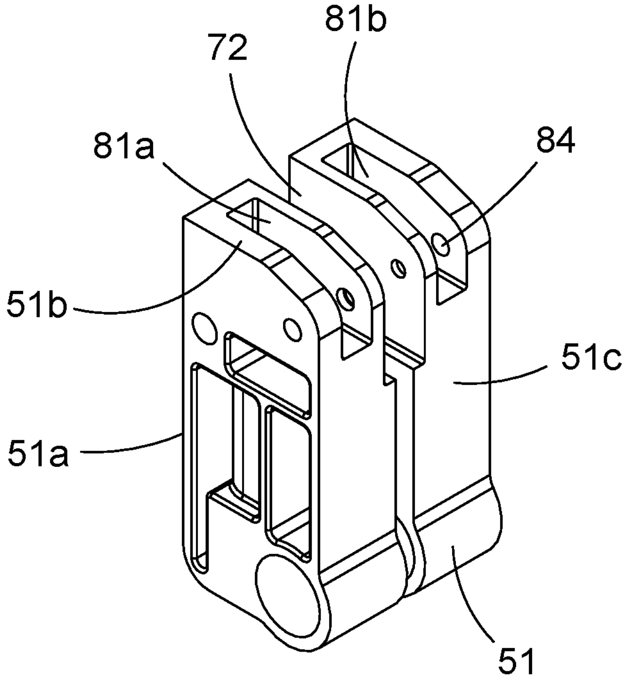
FIG. 15 is an enlarged, bottom isometric view of the rear blade guide.
Figure 16:
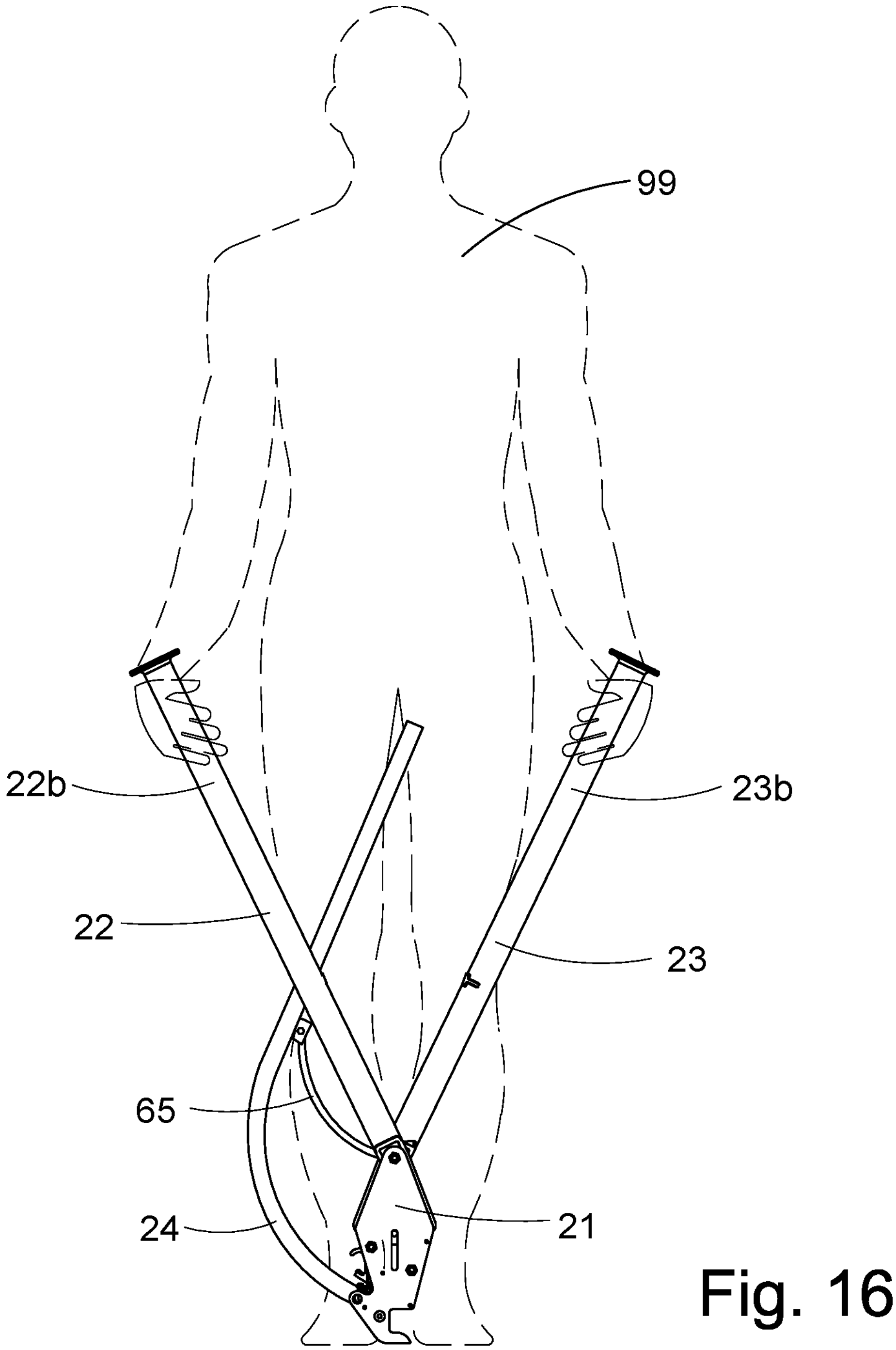
FIG. 16 is a front view of the tool held by a standing user shown in phantom.

Each of the side plates 47,48 has a support arm 87,88, respectively, extending forwardly from its bottom portion. The laterally spaced support arms 87,88 are spaced below the top portion of the side plates 47,48 to form forward opening throat 89. Each arm of the throat 89 are bounded by a horizontal upper edge 89*a*, a vertical rear edge 89*b*, a horizontal lower edge 89*c*, and an arcuate forward edge 89*d*. As can be seen in FIGS. 11 and 12, the rebars 26,27 (shown in phantom) during installation of the clip 25*a* are positioned under the lower end of the driver channel 57 with the lateral rebar 27 resting on the spaced support arms 87,88, which act as an anvil for the rebar 27, which in turn supports the overlying longitudinal rebar 26.

The bottom face of rebar guide 32 defines a tapering longitudinal guide groove 90 that laterally locates the overlying longitudinal rebar 26 centrally under the clip being installed. The forward face 52*a* of blade guide 51 partially closes the back of the throat 89.

The operation of the tool 20 can now be described with reference to the above description and the attached drawings.

Referring to FIGS. 11 and 12, three clips 25*a*,25*b*,25*c* have been introduced into the clip channel from the magazine 24. The innermost clip 25*a* is shown in dispensing position in the driver channel 57 under the retracted driver against the front wall of the driver 46. The handles 22,23 are disposed in an open position. As seen in FIG. 11, tool 20 has been positioned onto the adjoined rebars with the longitudinal rebar 26 overlying the lateral rebar 27. The rear edge of the throat 89 contacts the lateral rebar 27 and the longitudinal rebar 26 is disposed between the side plates 47,48.

The handles 22,23 are closed to push the driver 46 downward. As the overlying driver 46 advances, the clip 25*a* is pushed downward and the cords connecting it to the following clip 25*b* are severed. As the clip 25*a* is pushed further downward, the bottom of the overlying longitudinal rebar 26 is forced against the top of the underlying lateral rebar 27, which in turn is pushed against the support arms 87,88. The guide groove 90 of the rebar guide 52 centers the longitudinal rebar 26 between the side plates 47,48 and the longitudinal channel 67*e* of the driver 46 aligns the longitudinal U-shaped channel 30 of the clip 25*a* with the longitudinal rebar 26.

Closure of the handles 22,23 moves the driver 46 downward forcing the clip 25*a* over the longitudinal rebar 26 and onto the lateral rebar 27. The longitudinal rebar 26 is held in laterally aligned position by the guide groove 90 and the driver channel 67*e*. The lateral rebar 27 is held in longitudinally aligned position between the rear edge 89*b* of the throat 89 and the forward edges of the driver recesses 67*f*,67*h*. With the rebars 26,27 located in the throat 89 as the driver 46 is moved to fully extended position, the lateral rebar 27 is locked into the lateral channel 31 of the clip 25*a* and the longitudinal rebar 26 is locked in the longitudinal channel 30 of the clip 25*a* resulting in the two rebars 26,27 being tied together.

After the clip has been installed, the handles 22,23 are moved toward an open position lifting the driver 46. When the handles 22,23 are in their fully opened position, the compression springs 75*a*,75*b* acting against pin 73 in the forward arm 70*a* rotate the feeder level 70 to move the feeder pawl 78 downward and inward causing the forward edge of the feeder pawl 78 to engage the raised rib 40 of the next clip 25*b* and push it from preload position into dispensing position under the driver 46 thereby advancing the entire string of clips 25 held in the magazine 24. The anti-backup pawl 71 engages the forward rib of the clip in preload position to prevent movement of the clip string backward into the magazine 24.

At this point, the tool 20 can be moved to the next pair of rebars to be joined and the installation process is repeated.

While three clips 25 are shown for purposes of illustration herein, it is understood that much longer strings of clips are contemplated and are desirable. When long lengths of rebar clips 25 can be loaded into a tool magazine 24, the number of times the magazine has to be reloaded can be reduced saving time and effort. In addition, the use of a manually operated tool 20 without the necessity of providing a connection to electricity or pressurized air decreases costs and increases worker productivity.

It is understood that a long string of rebar clips as disclosed herein may contain hundreds of clips and may be arranged in a traverse coil and loaded into any suitably configured magazine.

From the foregoing, it will be observed that numerous variations and modifications may be effected without departing from the spirit and scope of the invention.

It will also be observed that the various elements of the invention may be in any number of combinations, and that all of the combinations are not enumerated here. It will be understood that no limitation with respect to the specific apparatus illustrated herein is intended or should be inferred. While specific embodiments of the invention have been disclosed, one of ordinary skill in the art will recognize that one can modify the materials, dimensions and particulars of the embodiments without straying from the inventive concept.

Other aspects, objects and advantages of this invention can be obtained from a study of the drawings and the foregoing disclosure.

Note that the terms “longitudinal,” “lateral,” “horizontal,” and “vertical.” as used herein are employed only to facilitate describing elements of the tool, the rebar, and the clip and their arrangement and do not denote any particular direction or limitation.

It should be understood that the terms “top,” “bottom,” “upper,” “lower,” “forward,” “rearward,” “downward,” “upward,” “inward,” “outward,” “inner,” “outer,” “end,” “front,” “back,” “side,” “first,” “second,” and similar terms as used herein, have reference only to the structure shown in the drawings and are utilized only to facilitate describing the invention. The terms and expressions employed herein have been used as terms of description and not of limitation.

As used herein, the term “adjoin” shall mean “to be close to or in contact with”; the term “within” shall mean “to be partially or completely inside of”; the term “axial” refers to a direction that is substantially straight; the term “transverse” refers to a direction other than the axial direction (e.g., orthogonal or nonorthogonal); the term “longitudinal” refers to a direction running generally lengthwise, e.g., from front to back; and, the term “lateral” refers to a direction running generally side to side.

What is claimed is:

1. A tool enabling a user to place a clip on rebars to tie the rebars together, the tool comprising:

a hub assembly having a body and a driver;

the body defining a first channel and a second channel, the first channel having an upper end and a lower end, the second channel having an inward end and an outward end, the inward end forming an intersection with the first channel;

a magazine connected to the body for holding a plurality of clips and introducing the clips into the second channel;

the driver being reciprocatably disposed within the first channel and having a drive surface for engaging a clip of the plurality of clips presented from the second channel into the intersection;

a pair of handles, each handle having an inner end and an outer end, the outer ends being grippable by a user, each of the handles being mounted to the body by a respective pivot intermediate their respective inner ends and respective outer ends for rotation between an open position and a closed position;

a pair of links, each link having a first end and a second end, the first ends being connected by upper pivots to respective inner ends of the handles and the second ends being connected by a lower pivot to the driver, the driver being moved to a retracted position with the drive surface overlying a clip of the plurality of clips located at the intersection when the handles are moved to the open position, and the driver being moved to an extended position when the handles are moved to the closed position;

a feeder pivotally mounted to the body and biased for rotation in a first direction to move a first part of the feeder into engagement with a clip of the plurality of clips in the second channel and urge it toward the first channel, the feeder having a second part engaged by the driver when the driver moves to an extended position to rotate the feeder in a second direction and disengage the first part of the feeder from the clips in the second channel; and a forwardly opening throat defined at the lower end of the first channel of the body under the first channel to hold a rebar positioned under the first channel, wherein closing of the handles extends the driver forcing a clip at the intersection onto rebars positioned within the throat and opening of the handles retracts the driver and the feeder moves a clip of the plurality of clips into the intersection.

2. The tool of claim 1, further including an anti-backup pawl pivotally mounted to the body and spring means biasing the anti-backup pawl into engagement with the clips in the second channel limiting backward movement of the clips away from the intersection.

3. The tool of claim 1, wherein the body comprises a pair of side plates and a plurality of guides, the side plates being disposed in laterally spaced relation and having facing internal surfaces forming lateral faces of the first channel and the second channel, and the guides extending between the side plates and having internal surfaces forming a forward face and a rearward face of the first channel and an upper face and a lower face of the second channel.

4. The tool of claim 3, wherein one of the guides is a front plate guide located between forward portions of the side plates and has an inner surface forming the forward face of the first channel.

5. The tool of claim 3, where one of the guides is a blade guide located between rearward portions of the side plates, the blade guide having an inner surface forming a part of the rearward face of the first channel above the intersection and a lower surface forming the upper face of the second channel.

6. The tool of claim 5, wherein the feeder is pivotally mounted to the blade guide.

7. The tool of claim 6, wherein the blade guide is located rearward of the front plate guide, the feeder is an angled lever having a forwardly extending arm and a downwardly extending arm, and further including a feeder pawl pivotally mounted to the downwardly extending arm and resiliently biased to engage a clip of the plurality of clips in the second channel.

8. The tool of claim 7, wherein the forwardly extending arm extends into the first channel for engagement with the driver, and further including spring means carried by the blade guide engaging the forwardly extending arm to resiliently bias the forwardly extending arm upwardly and to move the feeder pawl into engagement with a clip of the plurality of clips in the second channel.

9. The tool of claim 5, further including an anti-backup pawl pivotally mounted to the blade guide and spring means biasing the anti-backup pawl into engagement with a clip of the plurality of clips in the second channel limiting backward movement of the clips away from the intersection.

10. The tool of claim 3, wherein one of the guides is a rebar guide located between lower portions of the side plates, the rebar guide having an inwardly concave bottom surface for positioning a rebar extending longitudinally between the laterally spaced side plates, an upper surface forming a bottom face of the second channel, and an inner surface forming a part of the rearward face of the first channel below the intersection.

11. The tool of claim 1, further including an arm extending forwardly from the body at the lower end of the first channel, the arm forming a support surface for a laterally extending rebar positioned within the throat, whereby a longitudinally extending rebar overlying the laterally extending rebar is supported by the laterally extending rebar within the throat of the tool.

12. The tool of claim 1, wherein the handles are mounted on a common pivot.

13. The tool of claim 12, wherein the distance between the pivot mounting the handles to the body and the end of the handles is greater than the distance between the pivot mounting the handles to the body and the upper pivots connecting the handles to the links.

14. The tool of claim 13, wherein the distance between the pivot mounting the handles to the body and the end of the handles is at least 5 times greater than the distance between the pivot mounting the handles to the body and the upper pivots connecting the handles to the links.

15. The tool of claim 1, wherein the driver has a forward wall extending downward from the drive surface of the driver and defining a U-shaped channel for receiving a longitudinally extending rebar, and wherein a clip of the plurality of clips positioned at the intersection is located under the drive surface and rearward of the forward wall.

16. The tool of claim 1, wherein the driver has spaced side walls extending downward from the drive surface of the driver, rearward bottom of the side walls having concave recesses to engage a laterally extending rebar, and wherein a clip of the plurality of clips when positioned at the intersection is disposed under the drive surface of the driver between the side walls.

17. The tool of claim 1, wherein the driver includes a forward wall and spaced side walls extending downward from the drive surface of the driver to define a pocket having a cross-sectional size to receive a clip of the plurality of clips of a similar cross-sectional size positioned at the intersection.

18. The tool of claim 17, wherein the lower pivot is longitudinally centered over the pocket.

19. The tool of claim 1, wherein the magazine forms a nonlinear chute for holding the clips, wherein the clips are a connected string of clips.

20. A tool enabling a user to place a clip on rebars to tie the rebars together, the tool comprising:

a hub assembly having a body and a driver;

the body including a pair of side plates disposed in laterally spaced relation and a plurality of spaced guides extending between the side plates forming a first channel and a second channel, the side plates having facing internal surfaces forming lateral faces of the first channel and the second channel, the spaced guides having internal surfaces forming forward and rearward faces of the first channel and upper and lower faces of the second channel;

the first channel having an upper end and a lower end, the second channel having an inward end and an outward end, the inward end forming an intersection with the first channel;

a magazine connected to the body for holding a plurality of clips and introducing the clips into the second channel;

the driver being reciprocatably disposed within the first channel and having a drive surface for engaging a clip of the plurality of clips presented from the second channel into the intersection;

a pair of handles, each handle having an inner end and an outer end, the outer ends being grippable by a user, each of the handles being mounted to the body by a common pivot intermediate their respective inner and outer ends for rotation between an open position and a closed position;

a pair of links, each link having a first end and a second end, the first ends being connected by upper pivots to respective inner ends of the handles and the second ends being connected by a lower pivot to the driver, the driver being moved to a retracted position with the drive face overlying a clip of the plurality of clips located at the intersection when the handles are moved to the open position and the driver being moved to an extended position when the handles are moved to the closed position;

a feeder lever pivotally mounted to one of the spaced guides and biased for rotation in a first direction, the feeder lever having a forwardly extending arm and a downwardly extending arm;

a feeder pawl pivotally mounted to the downwardly extending arm of the feeder lever and resiliently biased to engage a clip of the plurality of clips in the second channel and urge it toward the first channel, the forwardly extending arm being engaged by the driver when the driver moves to an extended position to rotate the feeder lever in a second direction and disengage the feeder pawl from the clips in the second channel;

an anti-backup pawl pivotally mounted to the one of the spaced guides and spring means biasing the anti-backup pawl into engagement with a clip of the plurality of clips in the second channel limiting backward movement of the clips away from the intersection;

an arm extending forwardly from the body at the lower end of the first channel forming a throat under the first channel and providing a support surface for a laterally extending rebar positioned within the throat, whereby a longitudinally extending rebar overlying the laterally extending rebar is supported by the laterally extending rebar within the throat of the tool; and, wherein closing of the handles extends the driver forcing a clip of the plurality of clips at the intersection onto rebars positioned within the throat and opening of the handles retracts the driver and the feeder moves a clip of the plurality of clips into the intersection.

* * * * *